US006615317B2

(12) United States Patent
Roseborough et al.

(10) Patent No.: US 6,615,317 B2
(45) Date of Patent: Sep. 2, 2003

(54) METHODS AND SYSTEMS FOR PROVIDING A HIGHLY SCALABLE SYNCHRONOUS DATA CACHE

(75) Inventors: James Brian Roseborough, Berkeley, CA (US); Venkateswarlu Kothapalli, Burlington, MA (US); Toshiyuki Matsushima, Foster City, CA (US)

(73) Assignee: Fitech Laboratories, Inc., San Francisco, CA (US)

( * ) Notice: Subject to any disclaimer, the term of this patent is extended or adjusted under 35 U.S.C. 154(b) by 84 days.

(21) Appl. No.: 09/899,234

(22) Filed: Jul. 6, 2001

(65) Prior Publication Data

US 2002/0035673 A1 Mar. 21, 2002

Related U.S. Application Data

(60) Provisional application No. 60/216,883, filed on Jul. 7, 2000.

(51) Int. Cl.[7] .............................................. G06F 13/00
(52) U.S. Cl. ...................... 711/129; 711/146; 711/154
(58) Field of Search ................................ 711/129, 146, 711/154

(56) References Cited

U.S. PATENT DOCUMENTS

| | | | | |
|---|---|---|---|---|
| 6,256,675 | B1 * | 7/2001 | Rabinovich ................. 709/241 |
| 6,263,302 | B1 * | 7/2001 | Hellestrand et al. .......... 703/17 |
| 6,317,816 | B1 * | 11/2001 | Loen ........................... 711/171 |
| 2001/0023414 | A1 * | 9/2001 | Kumar et al. ................. 705/35 |
| 2001/0032154 | A1 * | 10/2001 | Schummer .................... 705/30 |
| 2002/0107770 | A1 * | 8/2002 | Meyer et al. ................. 705/36 |

* cited by examiner

*Primary Examiner*—Reba I. Elmore
(74) *Attorney, Agent, or Firm*—Finnegan, Henderson, Farabow, Garrett & Dunner L.L.P.

(57) ABSTRACT

A data caching technique is provided that is highly scalable while being synchronous with an underlying persistent data source, such as a database management system. Consistent with the present invention, data is partitioned along appropriate lines, such as by account, so that a data cache stores mostly unique information and receives only the invalidation messages necessary to maintain that data cache.

41 Claims, 11 Drawing Sheets

| Sample Database Table (Account Data) | | |
|---|---|---|
| Primary Key | Record Data (Incl. Selector Key) | Row Lock |
| | 402 | |
| . . . | . . . | . . . . |

FIGURE 4

| Sample Database Table (Master Data) | | | |
|---|---|---|---|
| Primary Key | Record Data (Incl. Selector Key) | | Table Lock |
| | | 502 | |
| | | | |

METHODS AND SYSTEMS FOR PROVIDING A HIGHLY SCALABLE SYNCHRONOUS DATA CACHE

RELATED APPLICATION

This application claims the benefit of U.S. provisional patent application No. 60/216,883, filed on Jul. 7, 2000, and incorporated herein by reference.

FIELD OF THE INVENTION

This invention relates to caches and, more particularly, to methods and systems for providing a scalable, synchronized data cache using partitioned data and invalidation triggers.

BACKGROUND OF THE INVENTION

Online transaction processing involves systems for conducting transactions, such as stock trades or electronic payments, over a network. A common architecture to support online transactions includes a user at a computer in communication with a server via a network. When the user sends a request for a transaction to the server, the server fulfills the request and, in some configurations, returns a confirmation to the user. To process the transaction, the server may access data about an account of the user or products that are available to the request. The server may retrieve such data from a persistent data source, such as a database.

As more users are added to such a system, additional servers can be added to process the increased number of requests. However, when these servers must access the same data source to fulfill the requests, a delay can result if one server must wait while another server accesses the data source. As the system grows and servers are added, the delays are compounded and system performance suffers. As the time required per transaction grows, users may become frustrated and stop using the online transaction processing system.

A common solution to this problem is to employ a data cache to store a temporary copy of data from the data source. If multiple servers are used, each can maintain a cache of data retrieved from the data source. To process a request, a server would first search its data cache for the required data. If the required data is found in the cache, the server can process the request without accessing the data source. Only if the required data is not found in the cache must the server access the shared data source. Once the required data is retrieved from the data source, the server can store the data in its data cache for future use. CORBA and Enterprise JavaBeans (EJB) are well-known architectures that provide support for such a distributed transaction processing system.

Even with the addition of data caching, traditional online transaction systems suffer problems with scalability and latency. As a system grows very large and employs many servers, delays will occur as those servers must access the data source to obtain data not found in a data cache. Furthermore, successful data caching relies on the accuracy of the data stored in a data cache. When a data item changes in the data source, delays in communicating the change to each data cache cause errors if a server uses outdated data to process a request.

SUMMARY OF THE INVENTION

It is therefore desirable to provide a data cache that is highly scalable so that performance does not degrade as the size of a data source increases. It is also desirable to provide a data cache that is synchronous with the data source so that there is no discrepancy between data in the data source and the available in the cache.

Methods and systems consistent with the present invention provide a data caching technique that is highly scalable while being synchronous with a persistent data source, such as a database management system. Consistent with the present invention, data is partitioned by, for example, account, so that a data cache stores mostly unique information and receives only invalidation messages necessary to maintain that data cache.

In accordance with an aspect of the invention, a system is provided to process transactions for a user. The system includes at least one application server that receives a query including an account number from the user via a request distributor, processes the query to determine a result, and returns the result to the user via the request distributor. The system further includes at least one data store configured to store account data corresponding to the account number in a table. The system further includes at least one data cache that maintains a cache partition corresponding to the account number, and, in response to the query processed by the at least one application server, searches for the result in the cache partition. If the result is not found in the cache partition, the data cache obtains the result from the data store, stores the result in the cache partition, and returns the result to the application server.

According to the present invention, a data processing method maintains set of cache partitions, each identified by an account number. When a query including a value is received, a particular cache partition corresponding to the query is identified from among the set of cache partitions, based on a relationship between the value of the query and the account number used to identify each cache partition in the set. A result to the query is provided based on the determination.

Additional features of the invention will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

The following description of embodiments of this invention refers to the accompanying drawings. Where appropriate, the same reference numbers in different drawings refer to the same or similar elements.

Figure 1:
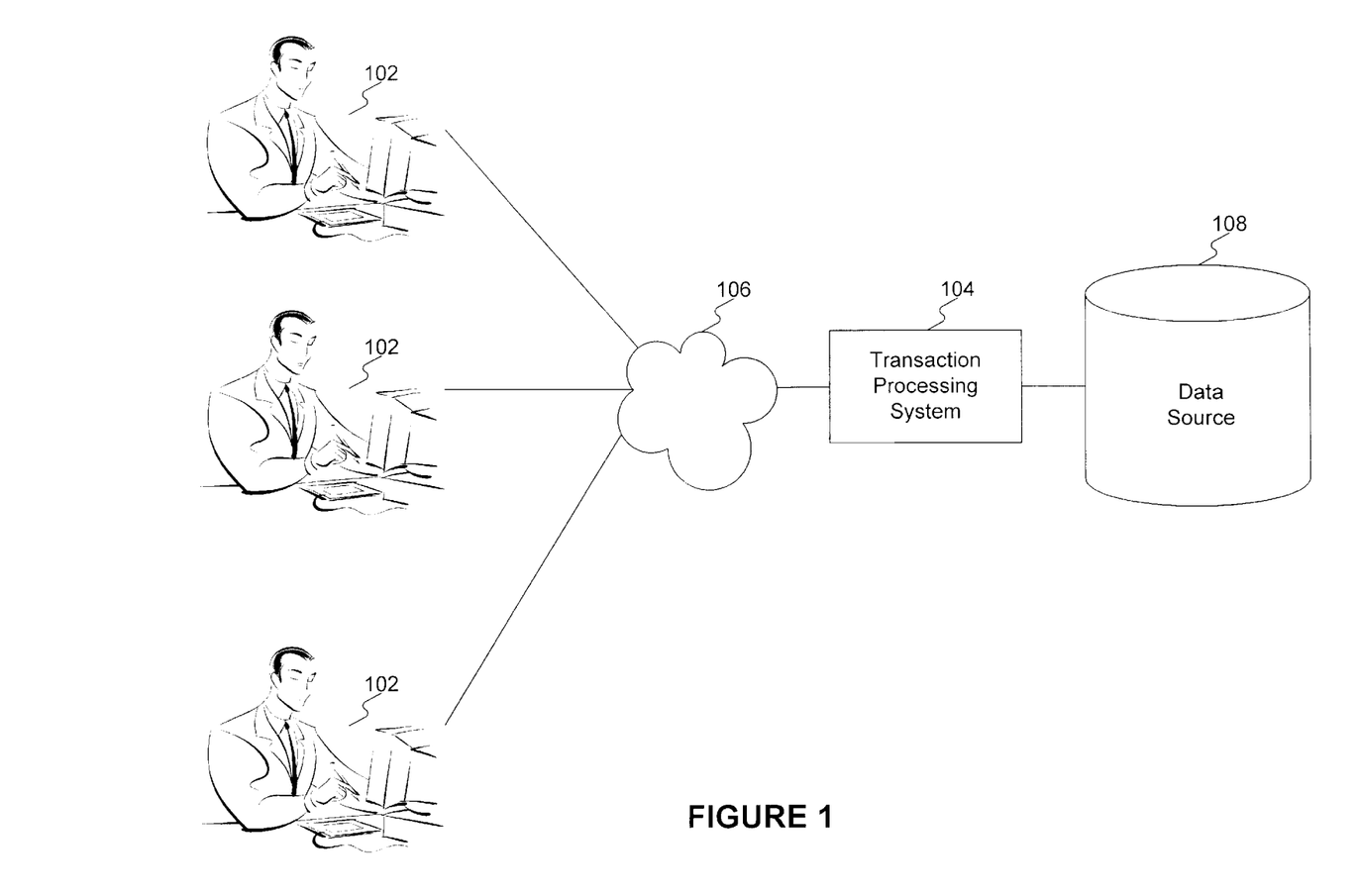
FIG. 1 is a high level block diagram of an exemplary system for practicing systems and methods consistent with the present invention.

FIG. 1 is a high level block diagram of an exemplary system for practicing the present invention. As shown, a plurality of users 102 use computers to communicate with a transaction processing system 104 via a network 106. Network 106 may be any type of communication medium, such as the Internet, a wide area network, or a local area network. A user 102 may submit a request for a transaction to transaction processing system 104. Any type of transaction may be processed in accordance with the principles of the present invention, including a stock trade or an electronic payment. To process this request, transaction processing system 104 accesses data stored in a persistent data source 108. Although three users 102 are depicted in FIG. 1, any number of users may communicate with transaction processing system 104 consistent with the present invention. Similarly, more than one data source 108 may be used.

Figure 2:
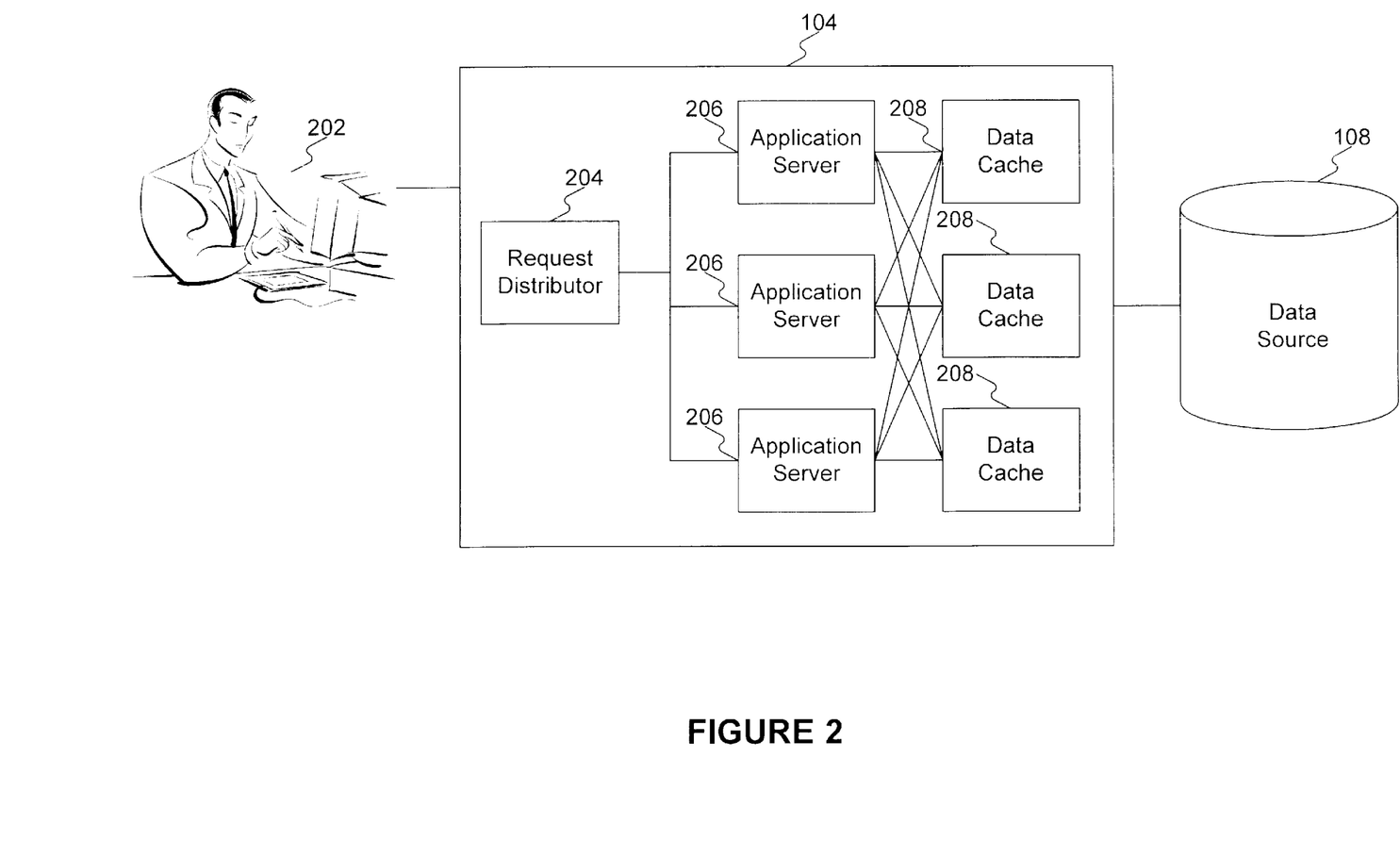
FIG. 2 is a more detailed block diagram of an exemplary system for practicing systems and methods consistent with the present invention.

FIG. 2 is a more detailed block diagram of an exemplary system for practicing the present invention. Transaction processing system 104 includes a number of components for processing a request from a user 202. These components include a request distributor 204, one or more application servers 206, one or more data caches 208, and a data source 108.

Request distributor 204 receives a request from user 202 and assigns the request to an application server for processing. Request distributor 204 may also return results of the request to user 202. If more than one application server is used, request distributor 204 performs load balancing by distributing requests among multiple application servers using known distribution techniques. Additionally, if request distributor 204 determines that an application server is not functioning properly, request distributor 204 may re-route a request to a different application server. One skilled in the art will recognize that the functions of request distributor 204 may be performed by a proxy server. In addition, other communication mechanisms between user 202 and transaction processing system 104 may be used consistent with the present invention.

Transaction processing system 104 uses application servers 206 to process a user's request using data from data source 108. To improve performance, application servers 206 may access one or more data caches 208 to obtain data without having to access data source 108 directly. This process is described in greater detail below with reference to FIGS. 7A and 7B. One skilled in the art will recognize that one or more data sources, one or more data caches, and one or more application servers may be used consistent with the present invention.

Figure 3:
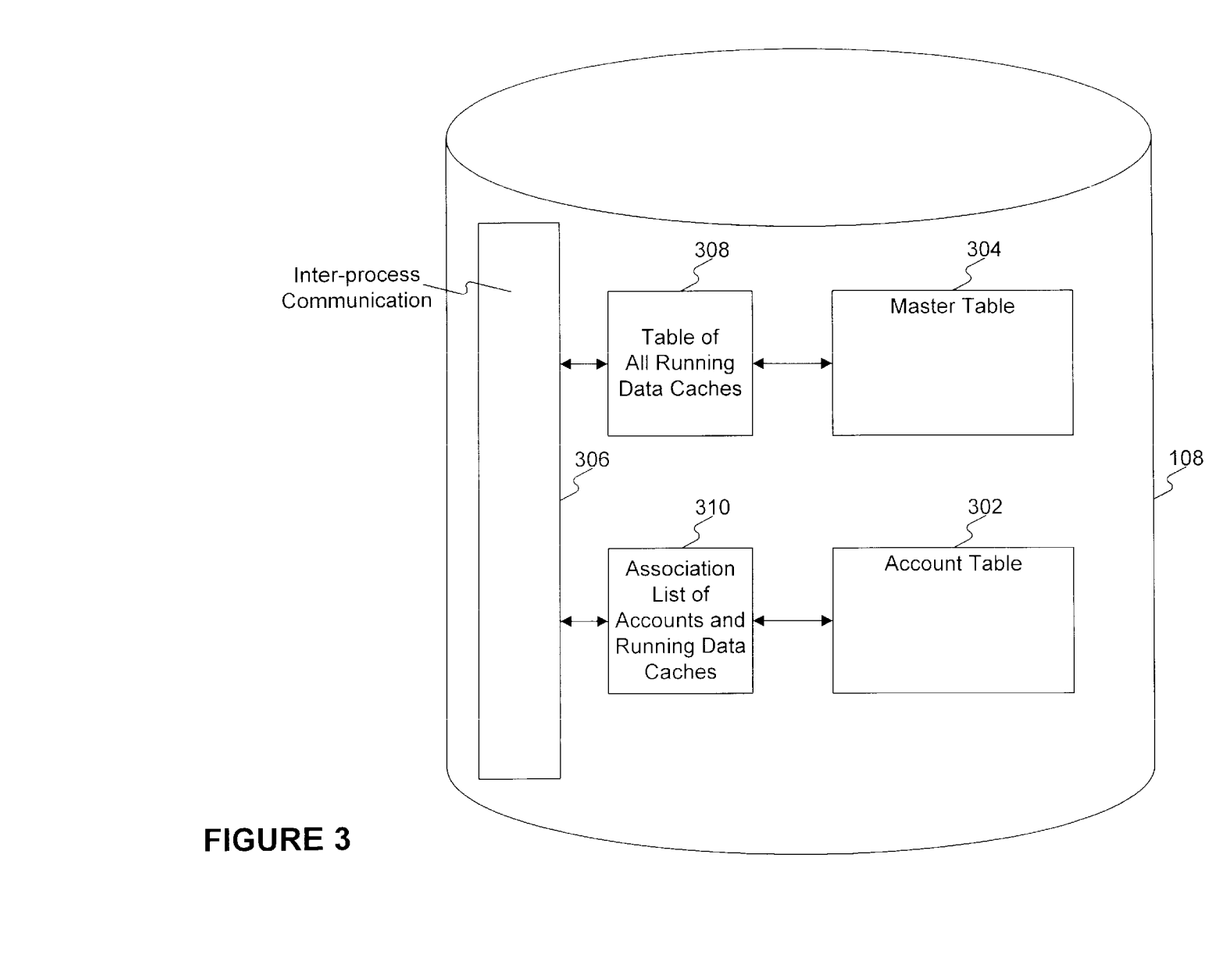
FIG. 3 is a detailed block diagram of a data source consistent with the present invention.

FIG. 3 is a detailed block diagram of a data source consistent with the present invention. Data source 108 stores data necessary to process requests from users. For example, in an online stock trading system or other transactional system, a user typically has an account number that is unique to that user. In one embodiment of the present invention, data store 108 stores data for each account in its own account table 302 based on the unique account number. Data that applies to all accounts, such as data relating to products or services, is stored in a master table 304. Although one account table 302 and one master table 304 are shown in FIG. 3, one skilled in the art will understand that multiple account tables and/or master tables can be used consistent with the present invention.

Data source 108 also includes a table 308 of all running data caches and an association list 310 that associates accounts with running data caches. These are used to maintain synchronization with data caches 206, as described below.

In one embodiment of the present invention, data about one account is stored in one account table and cached in one data cache. To implement this embodiment, association list 310 stores a list of each account table together with a reference to the data cache 208 that stores copies of data from that account table. Association list 310 may then be used to notify the appropriate data cache when data in an account table changes. Association list 310 can be updated by request distributor 204 each time an account is assigned to a data cache. This assignment may begin when a user logs onto the system and last until the user logs out of the system. Association list 310 may be accessed by request distributor 204 to determine which cache to route a query to, as described below with reference to FIGS. 7A and 7B.

Table 308 contains a reference to all data caches that are running in transaction processing system 104. When data in a master table changes, it may affect all accounts and therefore such a change can be communicated to all data caches 208 listed in table 308. Table 308 can be updated by transaction processing system 104 each time a new data cache is added. Storing the data in this fashion makes the present invention particularly useful for transactional systems in which data can be partitioned, for example, according to account number.

In one embodiment of the present invention, data source 108 includes a selector lock table that enables the locking of a selector key, such as an account number. While a selector key is locked using the selector lock table, no changes can be made to the data corresponding to the selector key.

Data source 108 uses an inter-process communication channel 306 to communicate with client processes, such as transaction processing system 104. Inter-process communication channel 306 can be implemented using, for example, Oracle™ DBMS-PIPE, Java™ RMI, or any other technique providing for reliable transfer of information between data source 108 and data caches 208. Additional capabilities of data source 108 can include storing data in a relational manner, reading committed data, processing primary key queries, locking a row or table as needed, and generating an event when data changes. These are well-known capabilities of a number of database management systems. As such, data source 108 may be implemented using available software such as Java™ Database Connectivity (JDBC), SQL, and Oracle™ Database Management System (DBMS). For ease of explanation, this description will treat data source 108 as a database having these features. However, one skilled in the art will recognize that any persistent data source, such as a remote server conforming to an established protocol that fulfills these functions, would be sufficient to practice the present invention.

Figure 4:
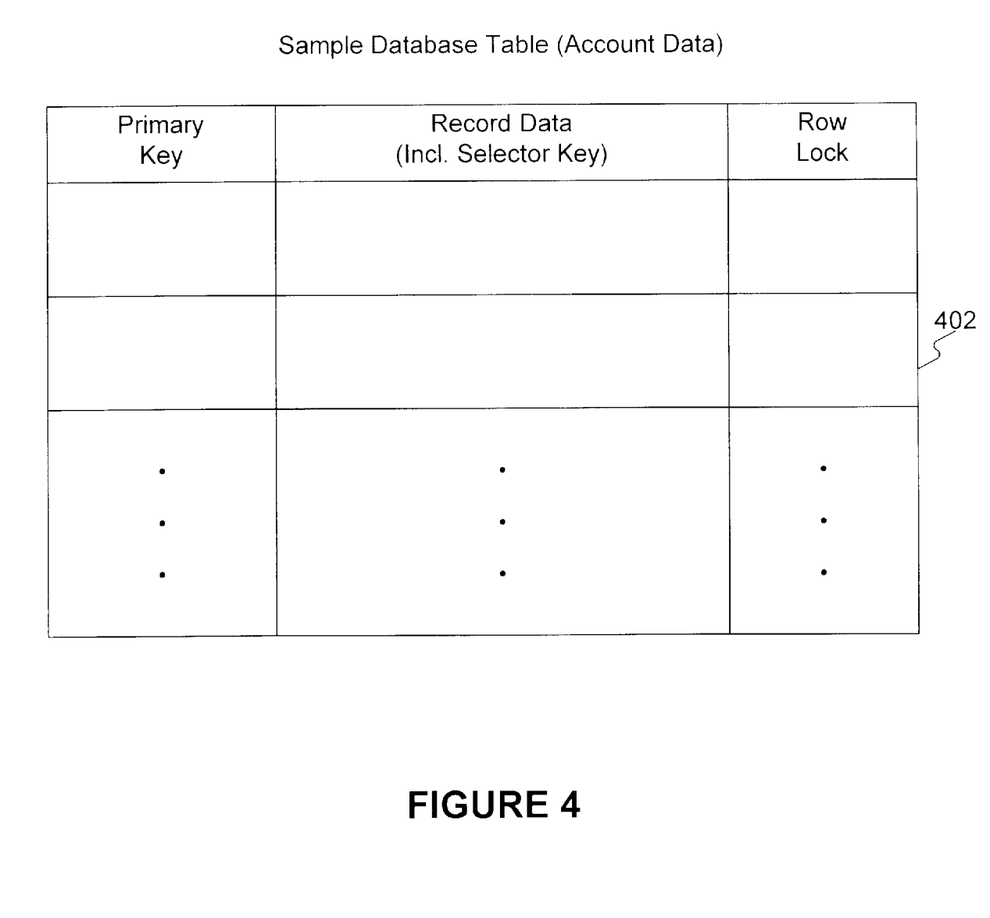
FIG. 4 depicts a sample account table consistent with the present invention.

FIG. 4 depicts a sample account table 402 consistent with the present invention. Data stored in sample account table 402 is organized in rows, each row identified by a primary key. Corresponding to each primary key is record data and a row lock. In an account table, a primary key and its corresponding record data might be defined as follows: primary key=account number; record data=current balance, bank branch identifier. When the row lock is enabled, no changes can be made to the information in the row. In an alternative embodiment, a table lock or a separate lock table may be used or the row lock may be or omitted altogether. The record data also includes a selector key that identifies the set of data corresponding to sample account table 402. For example, in an account-based system, the selector key can be an account number. In an alternative embodiment, a table may have no primary key. In such an embodiment, a data-source-specific identifier can be used to identify a row in data source 108.

Figure 5:
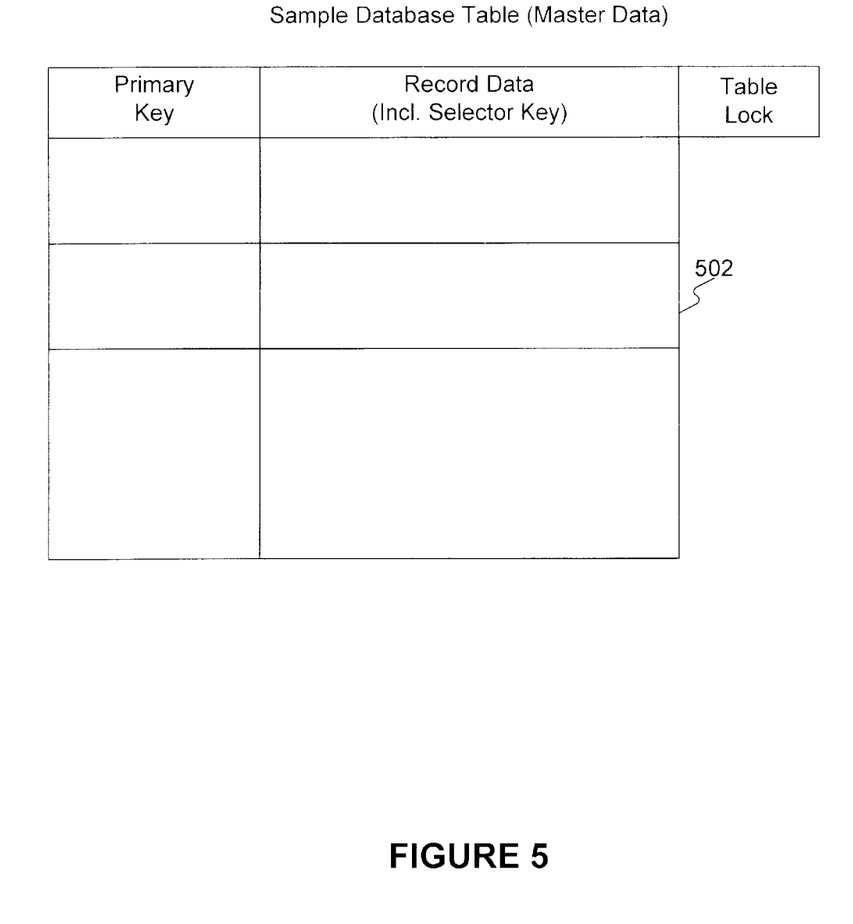
FIG. 5 depicts a sample master table consistent with the present invention.

FIG. 5 depicts a sample master table consistent with the present invention. Data stored in sample master table 502 is organized in rows, by a primary key. Corresponding to each primary key is record data. In a master table, a primary key and its corresponding record data might be defined as follows: primary key=product SKU; record data=product name, manufacturer identifier. Sample master table includes a table lock. When the table lock is enabled, no changes can be made to the information in the table. In an alternative embodiment, the lock may be implemented using row locks, a separate lock table, or omitted altogether. The record data includes a selector key that identifies the set of data corresponding to sample master table 502. In an account-based system, master data can be data that applies to all accounts. Therefore, for master data, the selector key might be a well-known number, such as 1 or 0, to indicate that the data applies to all accounts.

Figure 6:
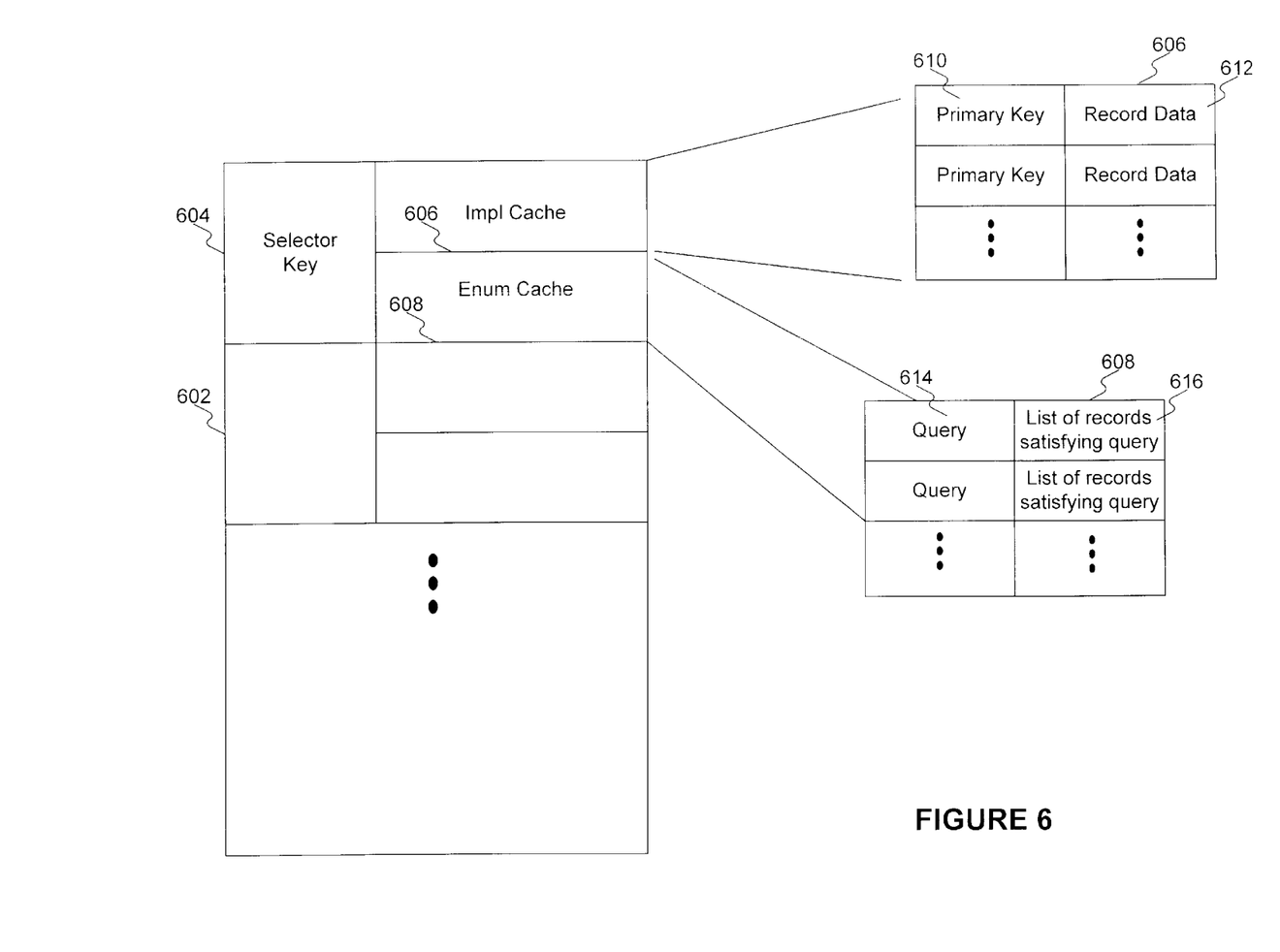
FIG. 6 is a block diagram showing a data cache consistent with the present invention in greater detail.

FIG. 6 is a block diagram showing a data cache in greater detail. Data cache 602 is divided into one or more partitions. In one embodiment of the present invention, each partition corresponds to an account table stored in data source 108. In this embodiment, a single data cache can support a number of accounts, and when the system needs to support additional accounts, additional data caches can be added. Each partition in data cache 602 contains a selector key 604 that identifies the set of data in the partition. For example, if data corresponding to a user's account is stored in a partition, the selector key might be an account number. In addition to selector key 604, each partition of data cache 602 contains two sub-caches: an "Impl" cache 606 and an "Enum" cache 608. These sub-caches store copies of data retrieved from data source 108.

Entries in Impl cache 606 contain a primary key 610 and corresponding record data 612. Impl cache 606 can be used to facilitate a request for a data item without having to access data source 108. For example, if a user submits a request for his account balance, the application server processing the request searches the appropriate Impl cache 606 for the primary key "account number" and returns the corresponding record data (e.g., current balance, bank branch identifier) Query processing is described in greater detail below with reference to FIGS. 7A and 7B.

Entries in Enum cache 608 contain a query 614 and a corresponding list 616 of records satisfying the query. Enum cache 608 can be used to facilitate a more complex query without having to access data source 108. For example, if a user submits a request for a list of his most recent stock purchases, the application server processing the request searches the appropriate Enum cache 608 for the query "recent stock purchases" and returns the corresponding list of records satisfying the query. Query processing is described in greater detail below with reference to FIGS. 7A and 7B.

Figure 7A:
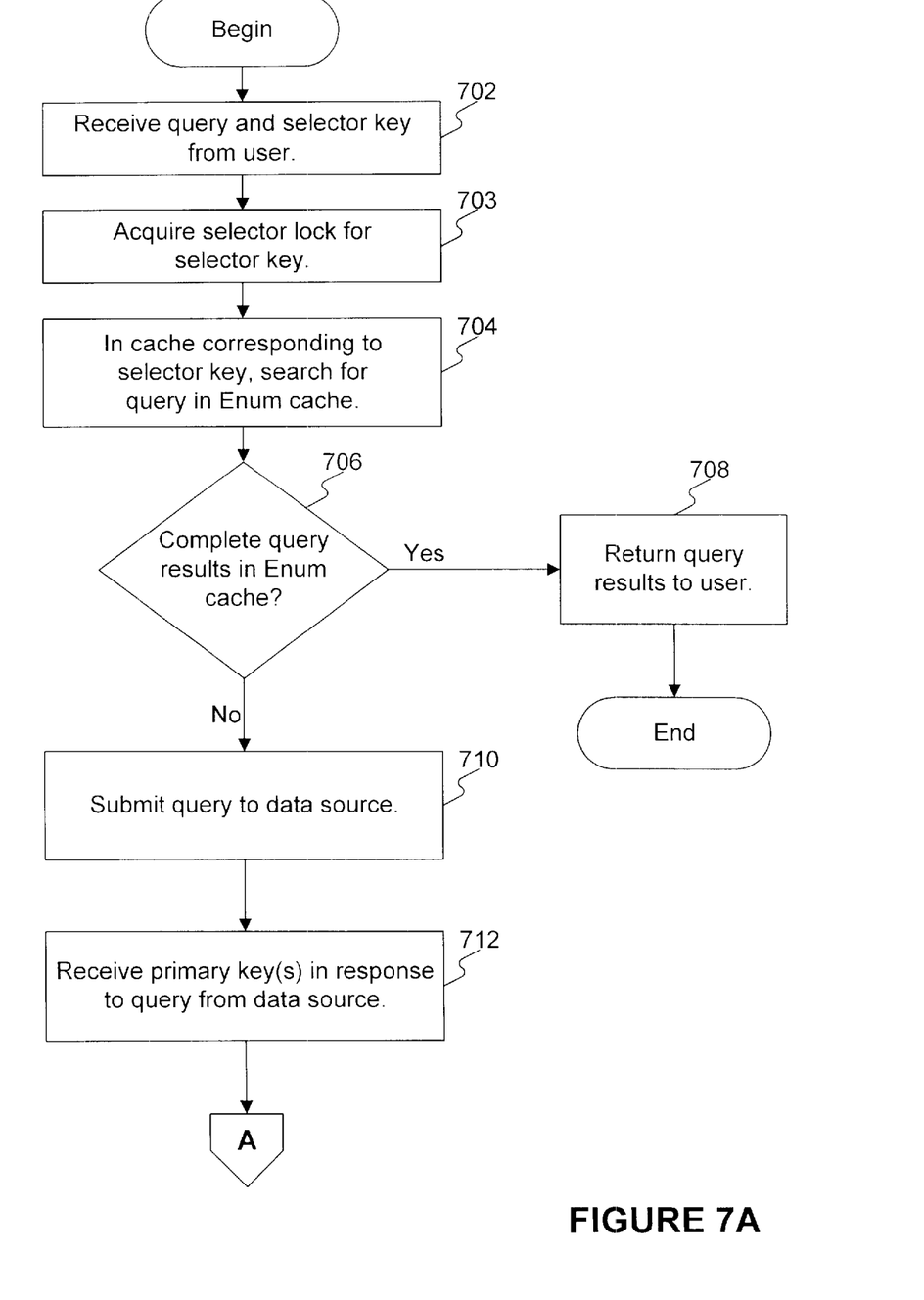
FIGS. 7A and 7B depict a flow chart of query processing using data caching consistent with the present invention.
Figure 7B:
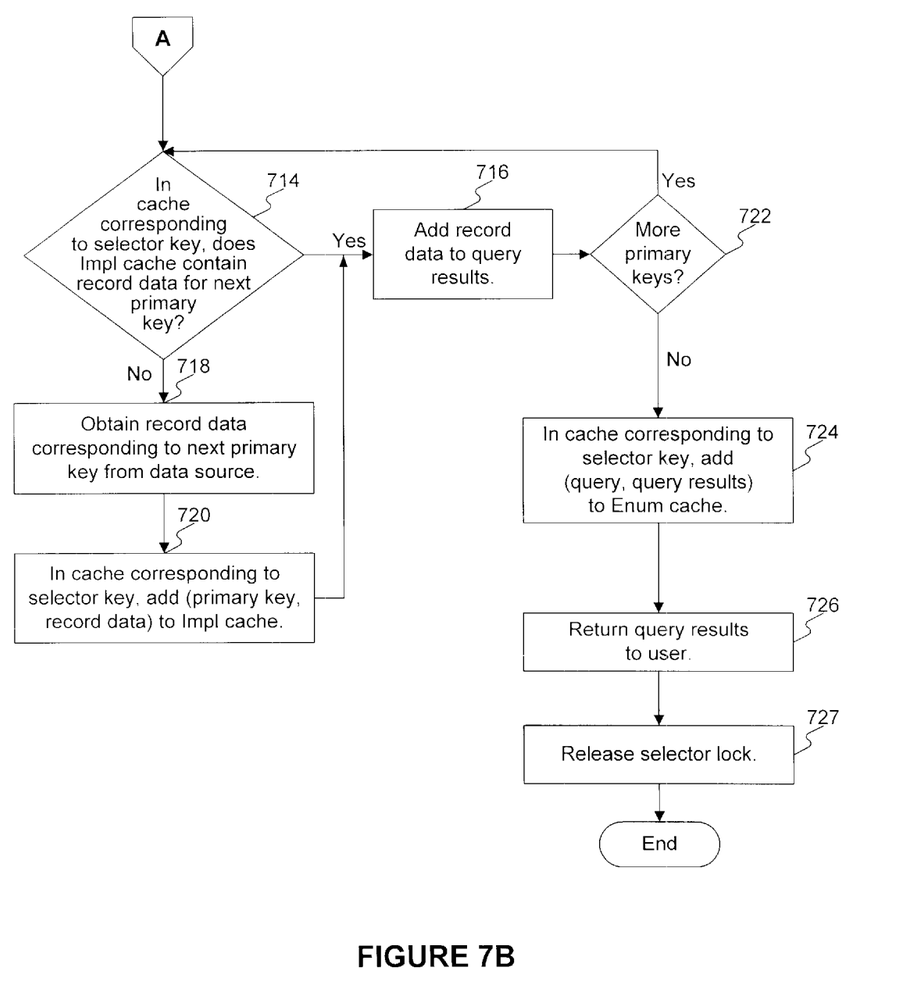

FIGS. 7A and 7B depict a flow chart for processing a query using data caching consistent with the present invention. The process begins when an application server 206 receives a query containing a selector key from a user 202 (step 702). The query may be sent to application server 206 by request distributor 204. In one embodiment, request distributor 204 maintains a record of which application server and/or data cache each account is assigned to. Then, when request distributor 204 receives a query, request distributor 204 routes the query to the proper application server and/or data cache. Alternatively, request distributor 204 and application servers 206 can access association list 310 in data store 108. To process the query, an application server 206 uses the selector key from the query to determine which data cache might contain the necessary information, i.e., which data cache stores the subset of data identified by the selector key. In an account-based implementation, the selector key can be the user's account number and application server 206 uses the account number to determine which data cache partition stores data for the user's account. Within that data cache, application server 206 performs one or more searches in the partition containing the selector key from the query.

Before query processing begins, a selector lock is acquired for the selector key (step 703). If the selector lock is not available, i.e., another process has locked the selector key, the query can be processed using the data source and the results are not cached. In this way, the query can be processed even if the cache is unavailable.

If the selector lock is acquired (step 703), then application server 206 searches for the query in the Enum cache within the cache partition containing the selector key (step 704). If a list of records satisfying the query is present in the Enum cache (step 706), then application server 206 returns the list of records to user 202 (step 708). If not, application server 206 must submit the query to data source 108 (step 710). Data source 108 processes the query using known database tools and returns one or more primary keys representing the results of the query (step 712). To complete its processing, application server 206 must then obtain the record data corresponding to each of the one or more primary keys.

To do this, application server 206 searches the Impl cache (still within the cache partition containing the selector key) for the next primary key (step 714). If the next primary key is found in the Impl cache, then application server 206 adds the corresponding record data from the Impl cache to the query results (step 716). If the next primary key is not found, application server 206 must obtain the corresponding record data from data source 108 (step 718). Data source processes the retrieval request using known database tools and returns the record data corresponding to the next primary key. Application server 206 then stores the next primary key and its corresponding record data in the Impl cache (step 720) and adds the record data to the query results (step 716). In this way, the Impl cache is updated to improve the processing of future queries.

If more primary keys were returned by data source 108 in step 712, then the process is repeated until record data corresponding to each primary key has been obtained and added to the query results (step 722). Application server 206 then adds an entry containing the query and the query results to the Enum cache (step 724) and returns the query results to user 202 (step 726). In this way, the Enum cache is updated to improve the processing of future queries. Finally, the selector lock is released (step 727).

As described above, the partitioning of data according to accounts in data source 108 and data caches 208 enables application server 206 to process a query very quickly and without knowledge about the underlying data. Another benefit of this data partitioning is the ability to synchronize data caches 208 with data source 108 so that any changes to data stored in data source 108 are shared with data caches 208 in a seamless and efficient manner, as described below with reference to FIGS. 8, 9, and 10. An additional benefit is that changes to the data source result in a minimum number of items being removed from the data caches, as described below with reference to FIG. 8.

Figure 8:
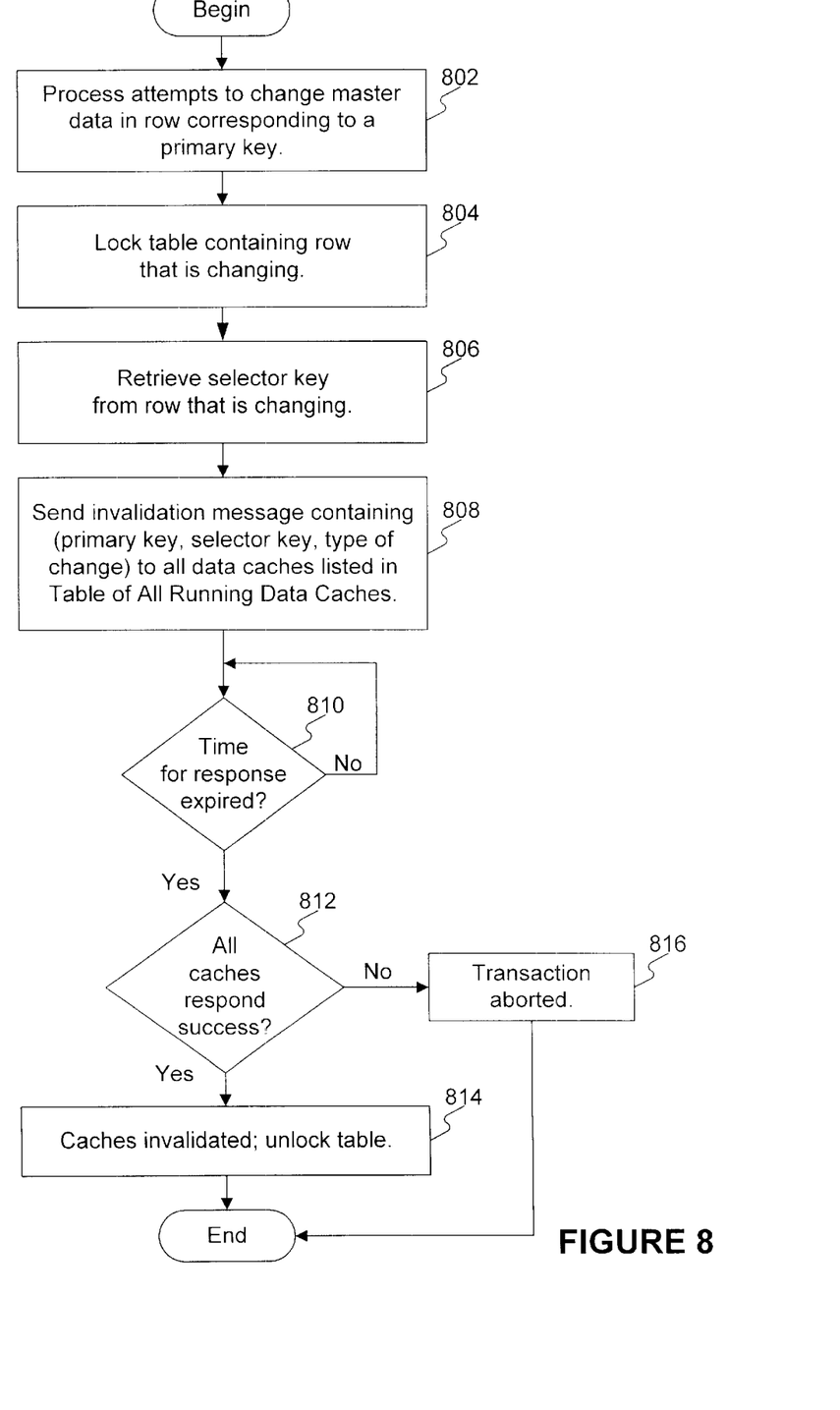
FIG. 8 is a flowchart of a process for updating data caches when master data in a data source changes, consistent with one embodiment of the present invention.

FIG. 8 is a flowchart of a process for updating data caches when master data in data source 108 changes consistent with one embodiment of the present invention. The process begins when a process attempts to change master data (i.e., data that affects all accounts) in a row corresponding to a primary key in a master table (step 802). This might occur, for example, when a system administrator adds a new product to the transaction processing system. Data source 108 locks the table containing the row that is changing (step 804) and retrieves the selector key from the row that is changing (step 806). If the lock is not available, the data source can wait until one is available or can abort the transaction. As explained above, the selector key for master data may be, for example, a reserved number such as 0 or −1 to indicate that the data affects all accounts.

To alert data caches 208 of the change, data store 108 sends an invalidation message to all data caches listed in the table 308 of all running data caches (step 808). The invalidation message includes the primary key of the row that is changing, the selector key, and the type of change to the row (i.e., add, change, or delete). Data store 108 may send the invalidation message to the data caches via inter-process communication channel 306. Data store 108 can wait a predetermined amount of time to receive a response from each of the data caches (step 810). If all of the data caches respond with success (step 812), then the caches have been invalidated and data store 108 unlocks the table to permit the change to occur (step 814). If all of the data caches do not respond with success, then the transaction is aborted (step 816). A data cache may not respond with success if, for example, the data cache has crashed.

Figure 9:
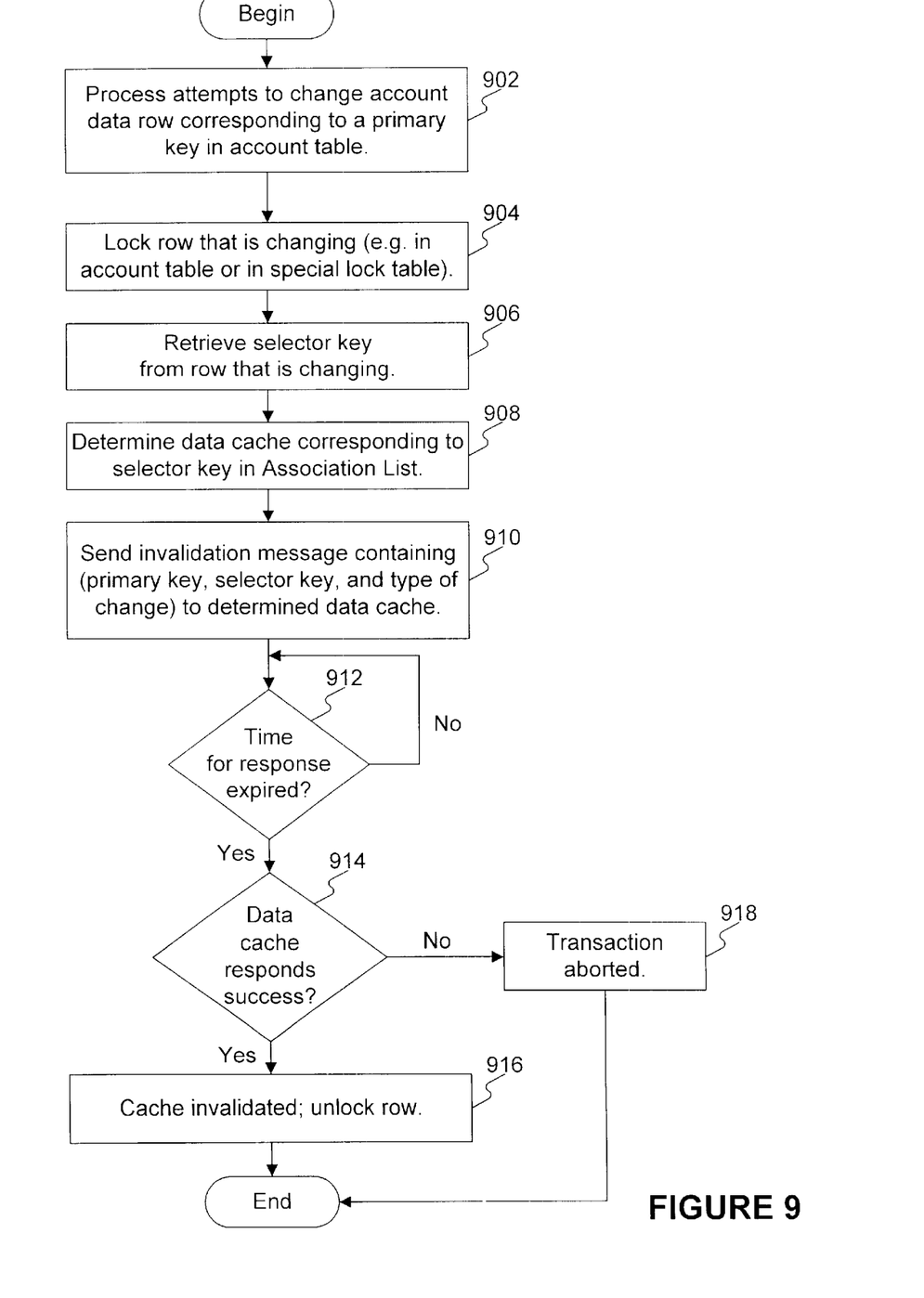
FIG. 9 is a flowchart of a process for updating data caches when account data in a data source changes consistent with one embodiment of the present invention.

FIG. 9 is a flowchart of a process for updating data caches when account data in data source 108 changes consistent with one embodiment of the present invention. The process begins when a process attempts to change account data in a row corresponding to a primary key in an account table (step 902). This might occur, for example, when a stock trade is executed or an electronic payment is dispatched. Data source 108 locks the row that is changing (step 904) and retrieves the selector key from the row that is changing (step 906). If a lock is not available, data source 108 can wait until one is available or can abort the transaction. When a row is locked, other processes cannot modify the data in the row. Data source 108 determines which data cache corresponds to the selector key (i.e., which data cache stores data for this account) using association list 310 (step 908).

To alert the appropriate data cache of the change, data store 108 sends an invalidation message to the determined data cache (step 910). The invalidation message includes the primary key, the selector key, and the type of change (i.e., add, change, or delete). Data store 108 may send the invalidation message to the data cache via inter-process communication channel 306. Data store 108 can wait a predetermined amount of time to receive a response from the data cache (step 912). If the data cache responds with success (step 914), then the cache has been invalidated and data store 108 unlocks the row to permit the change to occur (step 916). If the data cache does not respond with success, then the transaction is aborted (step 918). A data cache may not respond with success if, for example, the data cache has crashed.

Figure 10:
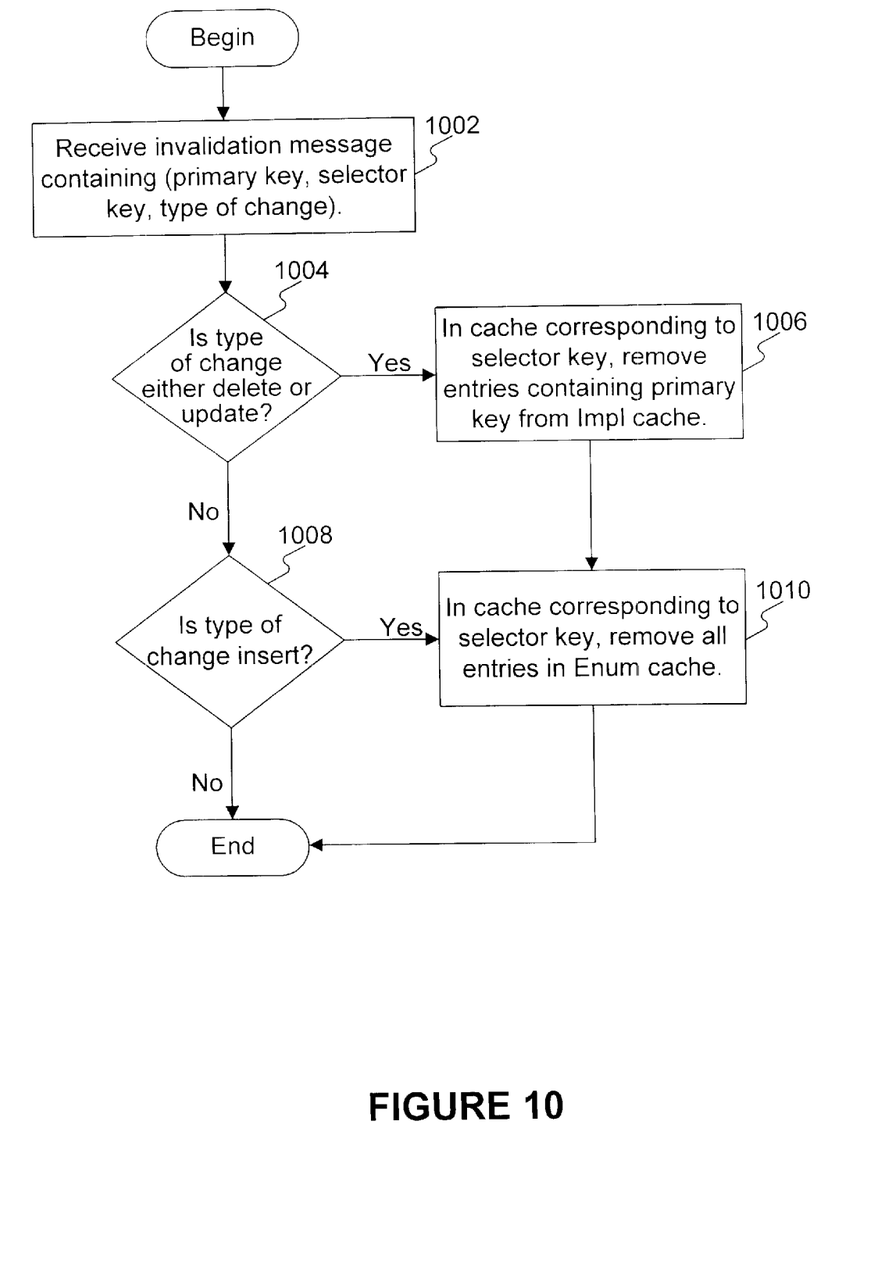
FIG. 10 is a flowchart of a process for invalidating a cache in response to a change in a data source.

FIG. 10 is a flowchart of a process for invalidating a cache in response to a change in a data source. The process begins when an invalidation message is received by a data cache (step 1002). As described above, the invalidation message indicates that data in the underlying data source has changed. The invalidation message includes a primary key, a selector key, and a type of change. If the type of change is either delete or update (step 1004), then the underlying record data corresponding to the primary key has been changed and the data cache must remove all outdated copies of this data. To do so, in the partition of the data cache corresponding to the selector key, all entries containing the primary key are removed (step 1006). This ensures that the old record data will not be retrieved in any subsequent request containing the primary key. Furthermore, once underlying record data has changed, it is possible that any stored query results will be affected. Therefore, all stored query results in the cache partition corresponding to the selector key are removed. To do this, all entries are removed from the Enum cache in the partition of the data cache corresponding to the selector key (step 1010).

If the type of change is an insert (step 1008), then existing record data in the Impl cache does not need to be changed, but any stored query results can no longer be trusted as accurate. Therefore, all stored query results in the cache partition corresponding to the selector key are removed. To do this, all entries are removed from the Enum cache in the partition of the data cache corresponding to the selector key (step 1010).

As described herein, the present invention provides a technique for caching data that is highly scalable, meaning that performance does not degrade as data size becomes extremely large. Furthermore, using the methods described above, a data cache is synchronous with the underlying data source, so that there is no latency between when data is committed and when it is first available in the cache.

This technique is particularly useful in a high volume transactional system such as an online stock trading system where per-user account information and across-user product information are largely separable. However, the present invention would also realize benefits in a system for storing data that is not as easily partitioned.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. Additional modifications and variations of the invention may be, for example, the described implementation includes software but the present invention may be implemented as a combination of hardware and software or in hardware alone. The invention may be implemented with both object-oriented and non-object-oriented programming systems.

Furthermore, one skilled in the art would recognize the ability to implement the present invention using various configurations. For example, the data caches could be combined with the application servers for additional performance gain. In another implementation, invalidation messages could be broadcast to all data caches regardless of whether account data or master data changes. In this case, the use of account-specific partitioning of data may be unnecessary. In another implementation, simultaneous multiple partitioning schemes may be used.

Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A system for processing transactions for a user, comprising:
   at least one application server configured to
      receive a query including an account number from the user via a request distributor,
      process the query to determine a result, and
      return the result to the user via the request distributor;
   at least one data store configured to
      store account data corresponding to the account number in a table; and
   at least one data cache in communication with the at least one application server and the at least one data store configured to
      maintain a cache partition corresponding to the account number,
      in response to the query processed by the at least one application server, search for the result in the cache partition,
      if the result is not found in the cache partition,
         obtain the result from the data store, and
         store the result in the cache partition, and
         return the result to the at least one application server.

2. The system of claim 1, wherein the at least one data cache is further configured to:
   store account data items in a first sub-cache in the cache partition,
   store recent query results in a second sub-cache in the cache partition.

3. The system of claim 1 wherein the at least one data store is further configured to:
   store master data corresponding to a plurality of accounts in a master data table.

4. The system of claim 1, further comprising a request distributor configured to:
   receive the request from the user,
   assign the request to the at least one application server, and
   return a result from the at least one application server to the user.

5. A method for processing account information using a data cache with multiple partitions, each partition corresponding to an account, comprising:
   receiving a query and an account number from a user;
   in a cache partition corresponding to the account number, searching for the query in a first sub-cache;
   if the query is not found in the first sub-cache,
      submitting the query to a data store,
      receiving at least one primary key in response to the query from the data store, and
      for each of the at least one primary key,
         searching a second sub-cache in the cache partition for the primary key and corresponding record data,
         if the primary key is not found in the second sub-cache,
            obtaining record data corresponding to the primary key from the data store and
            storing the record data and the primary key in the second sub-cache,
         returning the record data corresponding to the primary key to the user, and
         storing the primary key and corresponding record data together with the query in the first sub-cache; and
   if the query is found in the first sub-cache, returning record data stored together with the query in the first sub-cache to the user.

6. A method for updating a data cache when master data in a data store changes, comprising:
   receiving a request to change master data in the data store, the request including a primary key and a type of change;
   locating a row containing the primary key in a table in the data store;
   retrieving a selector key from the row;
   locking the table containing the row;
   sending a message to each cache server listed in a table of running cache servers; and
   if a positive response is received from each cache server, unlocking the table containing the row, and approving the request.

7. The method of claim 6, wherein the message contains the primary key, the selector key, and the type of change.

8. The method of claim 6, further comprising:
   waiting a predetermined period to receive a response from each cache server.

9. The method of claim 6 wherein the selector key is an account number.

10. A system for processing transactions, comprising:
    a data store comprising:
       a memory configured to store:
          a plurality of tables, each table containing master data that applies to a plurality of accounts; and
          a program configured to perform a method, the method comprising:
             receiving a request to change master data in the data store, the request including a primary key and a type of change,
             locating a row containing the primary key in a table in the data store,
             retrieving a selector key from the row,
             locking the table containing the row,
             sending a message to each cache server listed in a table of running cache servers, and
             unlocking the table containing the row upon receipt of an acknowledgement from each cache server; and
       a processor configured to execute the program.

11. The system of claim 10, wherein the message contains the primary key, the selector key, and the type of change.

12. The system of claim 10, wherein the method further comprises:
    waiting a predetermined period to receive a response from each cache server.

13. The system of claim 10, wherein the selector key is an account number.

14. A method for updating a data cache when account data in a data store changes, comprising:
    receiving a request to change stored account data, the request including a primary key and a type of change, locating a row containing the primary key in a table in the data store,
retrieving a selector key from the row,
locking the row,
determining a data cache corresponding to the selector key,
sending a message containing the primary key, the selector key, and the type of change to the determined data cache, and
if a positive response is received from the determined server,
unlocking the row and
approving the request.

15. The method of claim 14, further comprising:
waiting a predetermined length of time to receive a response from the determined server.

16. The method of claim 14, wherein the type of change is to delete a record from the data store.

17. The method of claim 14, wherein the type of change is to update a record in the data store.

18. The method of claim 14, wherein the type of change is to add a record to the data store.

19. A system for processing transactions, comprising:
a data store comprising
a memory configured to store
a plurality of tables, each table corresponding to an account; and
a program configured to perform a method, the method comprising:
receiving a request to change stored account data, the request including a primary key and a type of change,
locating a row containing the primary key in a table in the data store,
retrieving a selector key from the row,
locking the row,
determining a data cache corresponding to the selector key,
sending a message containing the primary key, the selector key, and the type of change to the determined data cache, and
unlocking the row upon receipt of an acknowledgement from the determined server; and
a processor configured to execute the program.

20. The system of claim 19, wherein the method further comprises:
waiting a predetermined length of time to receive a response from the determined server.

21. The system of claim 19, wherein the type of change is to delete a record from the data store.

22. The system of claim 19, wherein the type of change is to update a record in the data store.

23. The system of claim 19, wherein the type of change is to add a record to the data store.

24. A data cache with a plurality of partitions, each partition corresponding to an account, comprising:
a first sub-cache in a partition corresponding to an account number configured to store at least one query together with results corresponding to the at least one query;
a second sub-cache in the partition corresponding to the account number configured to store at least one entry containing a primary key together with record data corresponding to the primary key; and
a processor configured to
receive a message containing the account number, a target primary key, and a type of change, and
in the partition corresponding to the account number,
if the type of change is delete, remove entries from the second sub-cache containing the target primary key,
if the type of change is update, remove entries from the second sub-cache containing the target primary key, and
remove the contents of the first sub-cache.

25. The data cache of claim 24, wherein the processor is further configured to send a success message after the entries have been removed from the first sub-cache.

26. The data cache of claim 24, wherein the processor is further configured to send a success message after the entries have been removed from the second sub-cache.

27. The data cache of claim 24, wherein the processor is further configured to send a success message after the entries have been removed from the first sub-cache, and the entries have been removed from the second sub-cache.

28. A data processing method, comprising:
maintaining a set of cache partitions, each identified by an account number;
receiving a query including a value;
identifying, from among the set of cache partitions, a particular cache partition corresponding to the query, based on a relationship between the value of the query and the account number used to identify each cache partition in the set; and
providing a result to the query based on the determination.

29. The data processing method of claim 28, wherein the identifying further includes:
determining whether the set includes the particular cache partition; and
routing the query to the particular cache partition, when it is determined that the set includes the particular cache partition.

30. A method for updating a data cache when data in a data store changes, comprising:
storing, in a first sub-cache in a partition corresponding to an account number, at least one query together with results corresponding to the at least one query;
storing, in a second sub-cache in the partition corresponding to the account number, at least one entry containing a primary key together with record data corresponding to the primary key;
receiving a message containing the account number, a target primary key, and a type of change; and
in the partition corresponding to the account number,
if the type of change is delete, removing entries from the second sub-cache containing the target primary key,
if the type of change is update, removing entries from the second sub-cache containing the target primary key, and
removing the contents of the first sub-cache.

31. The method of claim 30, further comprising:
sending a success message after the entries have been removed from the first sub-cache.

32. The method of claim 30, further comprising:
sending a success message after the entries have been removed from the second sub-cache.

33. The method of claim 30, further comprising:
sending a success message after
the entries have been removed from the first sub-cache, and
the entries have been removed from the second sub-cache.

34. A method for updating a data cache when master data in a data store changes, comprising:
- receiving a request to change master data in the data store, the request including a primary key and a type of change;
- retrieving a selector key from an entry containing the primary key in a data structure in the data store;
- locking the data structure containing the entry;
- sending a message to each cache server identified in a set of running cache servers; and
- upon receipt of an acknowledgement from each cache server,
   - unlocking the data structure containing the entry, and
   - approving the request.

35. The method of claim 34, wherein the message contains the primary key, the selector key, and the type of change.

36. The method of claim 34, further comprising:
- waiting a predetermined period to receive a response from each cache server.

37. The method of claim 34, wherein the selector key is an account number.

38. A method for processing account information using a data cache with multiple partitions, each partition corresponding to an account, comprising:
- receiving a query and an account number from a user;
- searching for the query in a cache partition corresponding to the account number; and
- if the query is found in the cache partition corresponding to the account number, returning record data stored with the query in the cache partition to the user.

39. The method of claim 38, further comprising:
- submitting the query to a data store, if the query is not found in the cache partition;
- receiving a response to the query from the data store;
- returning the response to the user, and
- storing the response with the query in the cache partition.

40. A system for processing transactions for a user, comprising:
- at least one data cache configured to
   - maintain a cache partition corresponding to an account number;
   - receive a query containing the account number;
   - search for the query in the cache partition; and
   - return a result stored with the query.

41. The system of claim 40, wherein the data cache is further configured to
- obtain the result from a remote data store; and
- store the result in the cache partition.

* * * * *